Nov. 15, 1966  G. B. KLINEFELTER  3,285,270
ADAPTOR FOR HEATING SYSTEM AIR VALVES
Filed Dec. 11, 1963
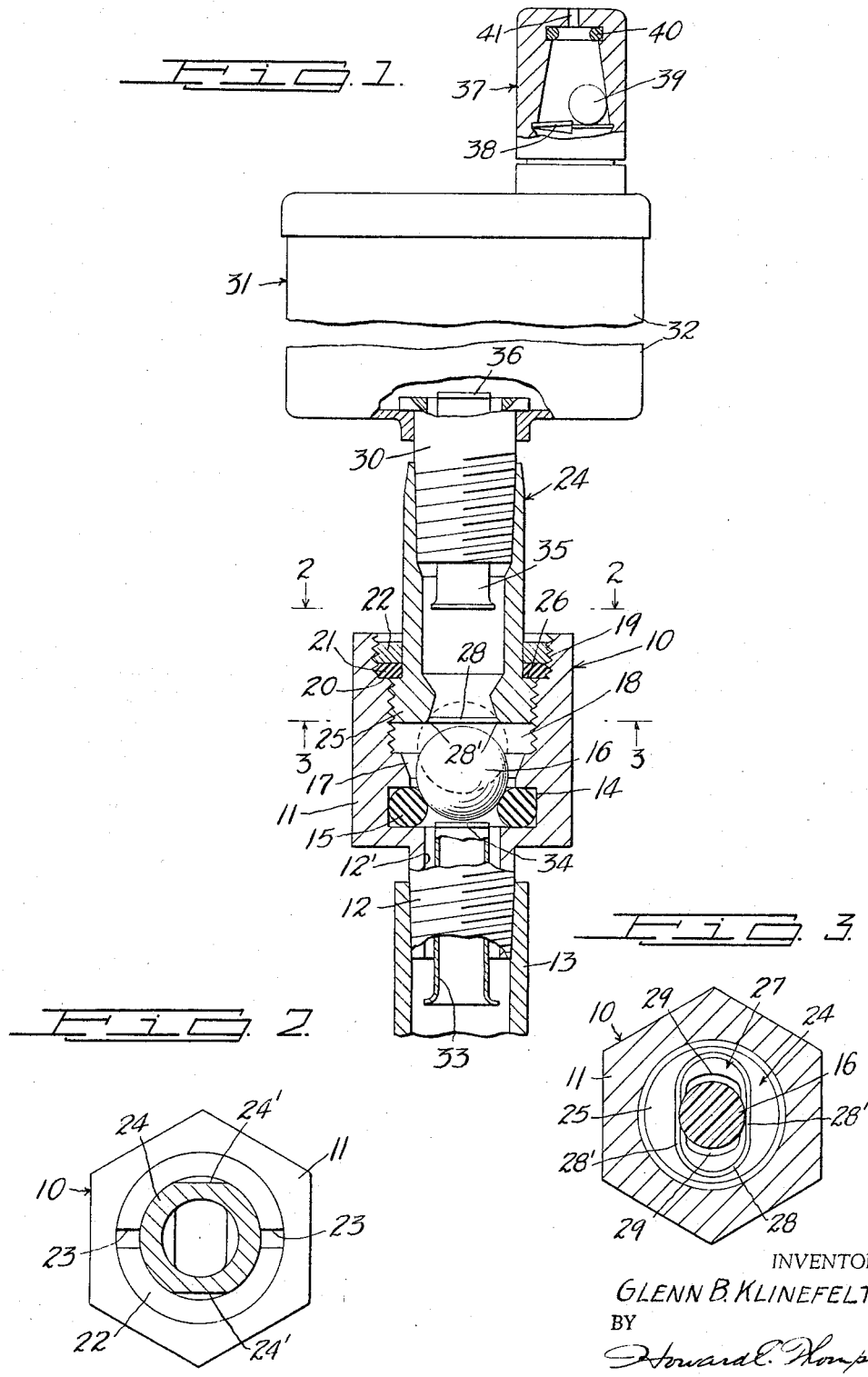
INVENTOR.
GLENN B. KLINEFELTER
BY
Howard E. Thompson
ATTORNEY

United States Patent Office 3,285,270
Patented Nov. 15, 1966

3,285,270
ADAPTOR FOR HEATING SYSTEM AIR VALVES
Glenn B. Klinefelter, Mountainside, N.J., assignor to Gorton Heating Corporation, Cranford, N.J., a corporation of New York
Filed Dec. 11, 1963, Ser. No. 329,693
5 Claims. (Cl. 137—202)

This invention relates to valves controlling the discharge of air, liquids or the like from radiators, wherein an adaptor is employed between the valve and the radiator to facilitate repairs to valves and installations thereof without the necessity of draining the heating system. More particularly, the invention deals with an adaptor including an automatically and manually controlled ball valve permitting normal functioning of the usual air valve in the automatic operation of the ball valve and definitely closing communication between the radiator and the air valve in the manual operation of said adaptor.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged sectional view through an adaptor made according to my invention, with parts of the construction shown in elevation and diagrammatically illustrating its attachment to a radiator discharge and the mounting of an air valve in connection therewith, part of the air valve structure being broken away and in section, the ball valve of the adaptor being illustrated in a raised position in dotted lines and the background showing of the threads of the adaptor being omitted for sake of clarity.

FIG. 2 is a section on the line 2—2 of FIG. 1; and

FIG. 3 is a section substantially on the line 3—3 of FIG. 1 showing the ball valve of the adaptor in the dotted line position of FIG. 1.

At 10 is shown one of my improved adaptors, which comprises a casing 11 of hexagon cross-sectional form, said casing having, at its lower end, a projecting externally threaded nipple or coupling sleeve 12 for mounting in the tubular discharge 13 of a radiator of a hot water heating system. The lower portion of the casing 11 has an annular recess 14 for reception of an O-ring 15, in connection with which a ball valve 16 operates, the valve being preferably formed of plastic material, so as to float within the casing as water rises in the casing to extend to the air valve employed. Above the recess 14, the casing has an upwardly flared reduced diameter passage 17, which opens into an internally threaded chamber 18. At the upper end of the casing is a larger diameter internally threaded recess 19, this structure forming an annular seat 20 for a rubber or similar flexible sealing ring 21 held in seated position by a nut 22 having opposed spanner wrench recesses 23, as clearly noted in FIG. 2 of the drawing.

The threads of the chamber 18 and recess 19 are both lefthanded threads, so as to control actuation of the ball valve actuating sleeve 24 of the adaptor, as later described. The lower end of the sleeve 24 has an enlarged collar 25, threaded to engage the threaded chamber 18. The enlargement of the collar 25 forms another seat 26, upon which the sealing ring 22 also seats in effecting the positive seal to the chamber 18.

The bore of the collar where it opens into the chamber 18 is of the elliptical contour illustrtaed at 27 in FIG. 3 of the drawing. The periphery of this bore has a bevelled seat 28, upon which the ball valve 16 is adapted to rest when in the raised positon, indicated in dotted lines in FIG. 1 of the drawing, so as to form at opposed sides of the bore 27 free passages 29 for water and/or air in the normal operation of the system, in other words, as and when the sleeve 24 is in the raised position shown in FIG. 1.

The upper portion of the bore of the sleeve 24 is internally threaded to receive the downwardly extending nipple 30 of a suitable air valve 31, part of the casing of which is indicated at 32.

Mounted in the sleeve 12 of the adaptor is a liquid feed tube 33 of smaller diameter than the bore 12' of the sleeve 12, the upper end of the sleeve having laterally extending wings 34 which seat upon the lower surface of the recess 14, the feed tube 33 permitting the free passage of air externally of the tube through the bore 12' and, thus, into the chamber 18 and up into the bore of the sleeve 24 to pass around a similar liquid feed tube 35 constituting part of the air valve 31, the tube 35 also having laterally extending wings 36 seating upon the upper end of the nipple 30 which is fixed to the bottom wall of the casing 32 in any desired manner. The air valve, diagrammatically shown in FIG. 1, is covered by a prior application filed by me January 17, 1963, Serial Number 252,072, now Patent No. 3,202,168. The upper portion of this valve has an air discharge control device 37 employing a flow control disc 38, upon which is arranged a spherical member 39 adapted to seat upon an O-ring 40 at the upper portion of the device 37 to control discharge of air through the discharge passage 41. The spherical member 39 is preferably of buoyant material.

The adaptor 10 is illustrated substantially in its normal use position when the heating system is in operation and the ball valve 16 is free to move from the O-ring 15 to seat on the elliptical bore 27, as previously described, the valve 16 seating on the parallel sides 28' of the seat 28, as illustrated by the dotted line showing of the valve 16 in FIG. 1. When the ball valve 16 is in this raised seated position, air, as well as water, would be free to pass around the ball valve through the passages 29 into and through the sleeve 24 and then into the casing 32, as will be apparent.

When it is desired to repair the valve 31 or to substitute a new valve therefor, all that is necessary is to rotate the sleeve 24 to bring the ball valve 16 into pressure engagement with the O-ring 15, as diagrammatically illustrated by the full line position of the ball 16 in FIG. 1, which operation shuts-off all exhaust from the discharge 13; whereupon, the valve 31 can be detached from the sleeve 24, the repair made thereto, or a new valve coupled with the sleeve; whereupon, the sleeve 24 is then moved into the raised position shown in FIG. 1. To facilitate operation of the sleeve 24, opposed sides of the sleeve will be flattened, as seen at 24' in FIG. 2 of the drawing, so that a wrench or other tool can be applied to the sleeve. By employing the left-hand threads, operation of the sleeve 24 can be performed without disturbing engagement of the adaptor with 13, or the valve 31 with the sleeve 24.

It will be understood that by movement of the ball valve 16 into its seated position, as above described, the entire heating system can be maintained in its normal cycle of operation without necessitating the drainage of any part of the system during the period of time that the repair or new installation is made; thus, effecting a material saving in the labor time otherwise found to be necessary in first draining a system and then readjusting and setting the system, insofar as all of the different valves of the system are concerned.

Having fully described my invention, what I claim as new and desire to secure by Letters Patent is:

1. An adaptor for positioning between the tubular discharge of a radiator and an air valve controlling said radiator discharge, said adaptor comprising a casing having a threaded nipple at one end for coupling with the tubular radiator discharge, a buoyant ball valve mounted and movable in a chamber of said casing, a sleeve in threaded engagement with the casing and movable in the chamber for movement of the ball valve into seated position in said casing, said sleeve having an internal thread at an upper reduced outer end thereof for detachably coupling an air valve with said sleeve, the inner end portion of the sleeve opening directly into the chamber of said casing in an elliptical seat for checking movement of the ball valve into open position in one normal position of said sleeve in said casing in retaining communication between said chamber and a passage extending through said sleeve, an O-ring seat for said ball valve in the lower portion of the chamber of said casing, and a liquid feed tube supported in said chamber and arranged in said nipple, said liquid tube projecting beyond the lower end of said nipple.

2. An adaptor as defined in claim 1, wherein the threaded engagement of the sleeve with said casing is by way of lefthanded threads.

3. An adaptor as defined in claim 1, wherein the threaded portion of the sleeve is on a large diameter collar of the sleeve, a nut in threaded engagement with the casing above said collar, a sealing ring between the nut and said collar, and said sealing ring seating on the casing to form between the casing and sleeve a positive seal.

4. The combination with an air valve for hot water heating systems, of an adaptor coupled with and positioned between an air valve and a tubular discharge of a radiator of a system, said adaptor comprising a tubular casing open at upper and lower ends a sleeve in threaded engagement with the upper portion of said casing for adjustment of the sleeve in the casing, an O-ring seat in the lower portion of the casing, a buoyant ball valve operatively engaging said seat and an elliptical seat at the lower end of said sleeve, the lower end of the casing having a nipple for attachment to the tubular discharge of a radiator, the upper end of said sleeve having an internal thread for detachable mounting of an air valve therewith, normal position of said sleeve in the casing providing free passage of water and air through the adaptor for transmission to the air valve coupled with said sleeve, and said sleeve being movable to a position seating the ball valve on said O-ring in definitely closing communications between the radiator tubular discharge and said air valve, whereby said air valve may be detached from the adaptor for repair or replacement without interference with the normal function of the heating system in which the radiator in question constitutes a part.

5. An adaptor as defined in claim 4, wherein a liquid feed tube is supported in the casing and arranged axially of said nipple to a point beyond the nipple end.

References Cited by the Examiner

UNITED STATES PATENTS

| | | | |
|---|---|---|---|
| 866,285 | 9/1907 | Klie | 251—214 |
| 1,517,459 | 12/1924 | Reiter | 137—202 |
| 2,144,952 | 1/1939 | Williams | 137—533.11 |
| 2,385,584 | 9/1945 | Parton | 137—201 XR |
| 2,892,614 | 6/1959 | Majneri | 251—347 |
| 2,933,095 | 4/1960 | Rumsey | 137—533.15 XR |

ALAN COHN, *Primary Examiner.*